Aug. 2, 1966  E. FUHRMANN ETAL  3,263,913

SEAL

Filed Sept. 21, 1965

Inventors

Ernst FUHRMANN &
Manfred FRENZEL

By Spencer & Kaye

ATTORNEYS 3,263,913
SEAL
Ernst Fuhrmann and Manfred Frenzel, both of Burscheid, Germany, assignors to Goetzewerke Friedrich Goetze Aktiengesellschaft, Burscheid, Germany
Filed Sept. 21, 1965, Ser. No. 488,871
Claims priority, application Germany, Sept. 24, 1964, G 41,597
10 Claims. (Cl. 230—145)

The present invention relates to a radial seal for rotary piston internal combustion engines, in the form of a packing strip which is positioned in a groove formed in the piston, for sealing the piston circumferentially with respect to the piston housing, and more particularly to a packing strip having radial bores which open at the reverse side of the strip to the face of the groove.

Radial seals in the form of packing strips for sealing rotary pistons relative to the inner wall of the housing are known and are generally disposed in grooves, formed in the piston and extend for the axial width thereof, for radial movement against the housing wall. The seals are generally of metal. For a satisfactory sealing between the packing strip and the housing, it is important that the strip adapt as completely as possible to the curved wall surface of the housing in order to avoid power losses. Furthermore, the packing strips must be designed so as not to leave chatter marks on the housing surface when the engine is operating at full power. In order to eliminate chatter marks, packing strips having vertically and horizontally applied bores have been proposed. Although the strips having the bores have served the purpose, engines provided with these strips show a power loss as compared with engines having closed strips. This is due to the strips being deformed under the influence of the temperatures and pressures that occur in the combustion chambers and therefore not sealing properly.

It is an object of the present invention to provide a packing strip which eliminates chatter marks and reliably adapts to the curvature of the housing surface in order to improve the sealing effect.

The present invention provides a radial seal in the form of a packing strip having radial bores that are only open at the reverse side of the packing strip, i.e., the side open to the face of the groove. The bores are provided with different diameters or they are arranged with varying distances between bore centers so as to improve the heat flow through the strip by maintaining larger material cross-sections at the strip center than at the end portions of the strip. In addition to the improved heat flow, the stability of the packing strip is increased in that non-uniform deformation along the length of the strip is reduced and the strip can thereby better adapt to the curvature of the housing surface whereby power losses are eliminated.

Additional objects and advantages of the present invention will become apparent upon consideration of the following description when taken in conjunction with the accompanying drawings in which.

Figure 1:
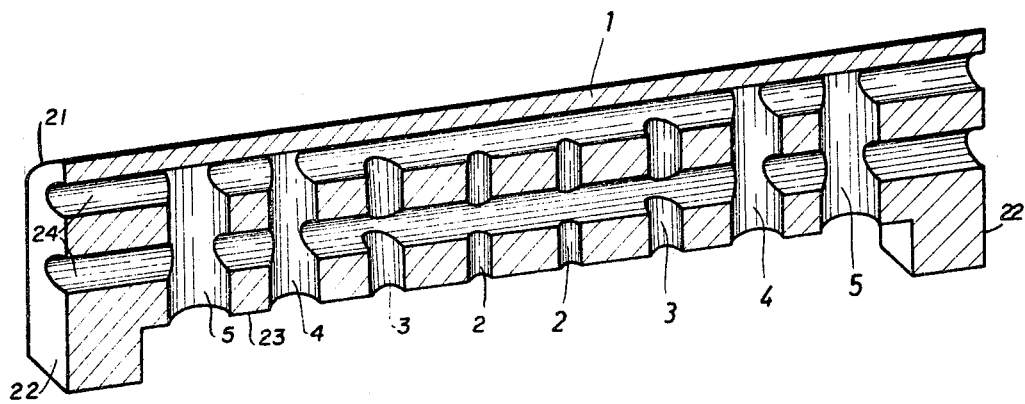
FIGURE 1 is a longitudinal cross-sectional view of a packing strip according to the present invention, having bores of different sizes.

Referring now to the drawing, there is shown in FIGURE 1 an elongated packing strip 1 having a curved upper surface 21 and provided with radial bores 2, 3, 4, and 5, the diameter of the bores being increased from the center of the strip to the end portions 22.

Each of the bores is open at the reverse side 23 of the strip, i.e., the side of the strip which engages the groove. The strip 1 is thereby provided with a larger material cross section at its center, such as between the bores 2, and correspondingly smaller material sections away from the center toward the end portions of the strip. The provision of larger material cross-sections at the center portion of the strip improves the heat flow through the strip and aids in stabilizing the packing strip in that bulging of the strip is reduced and a uniform axial deformation of the strip is provided. It also is possible, as shown in FIGURE 1, to provide at least one axial boring 24 which also aids in the reduction of the non-uniform axial deformation of the strip thereby eliminating chatter marks on the housing which are produced by bulging of the strip along its length. Thus, the upper curved portion 21 of the strip can better adapt to the curvature of the inner wall surface of the housing and provide an improved sealing effect, thereby eliminating power losses.

Figure 2:
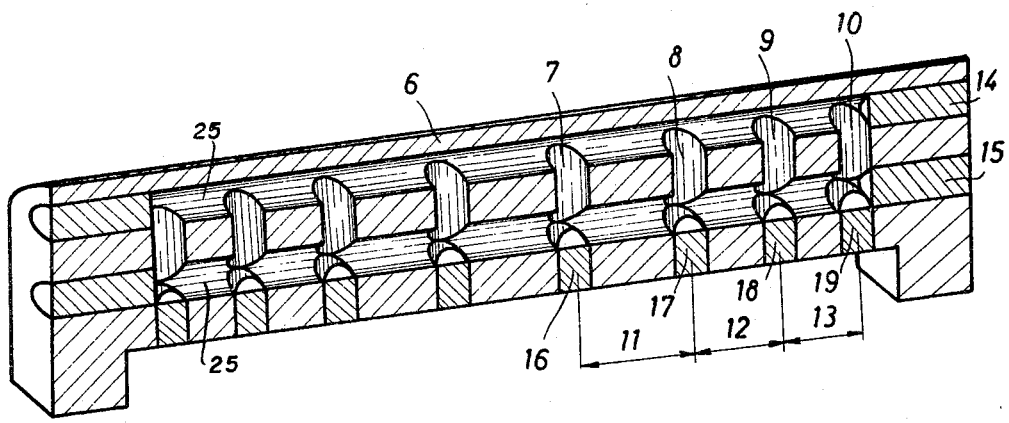
FIGURE 2 is a longitudinal cross-sectional view of another embodiment of a packing strip according to the present invention and having closed bores.

There is shown in FIGURE 2, which is another embodiment of a radial seal according to the present invention, a packing strip 6 provided with radial bores 7, 8, 9, and 10 of equal diameter and having distances between the bore centers which decrease from the center of the strip to the end positions. Thus, a larger material cross-section is maintained at the center portion of the strip and the size of the material cross-sections decreases toward the end portions thereby providing an improved heat flow in the same manner as the embodiment of FIGURE 1, and in fact an improvement over the heat flow of that figure. Each of the radial bores is also only open at the reverse side of the strip facing the piston groove and axial bores 25 are also provided within the packing strip.

Since the bores provided within the strip may cause an undesired enlargement of the gas chamber formed behind the packing strip at the reverse side thereof, the bores may be sealed by stoppers 14, 15, 16, 17, 18 and 19, as shown in FIGURE 2, and the remaining hollow spaces within the bores filled with a coolant. The coolant may for example be sodium which will also aid in reducing the non-uniform axial deformation of the strip at operating temperatures. This is accomplished through a bi-metallic effect whereby as the temperature increases, the sodium causes a straightening of the packing strip. The sodium liquefies at approximately 90° C., and flows through the bores of the packing strip during the movement of the strip and thereby transfers heat from the areas exposed to extremely high temperatures to the cooler areas of the strip. The sodium functions, in addition to the metal of the packing strip, as a second metal having temperature equalizing characteristics for preventing non-uniform axial deformation of the packing strip which is caused by high temperatures.

Although the provision of a coolant and stoppers has been discussed with reference to FIGURE 2, it should be noted that both stoppers and coolant may be provided in the embodiment of FIGURE 1. It is also to be noted that the bores within the packing strip may be produced by a casting or molding process.

It will be understood that the above description of the present invention is susceptible to various modifications, changes and adaptations, and the same are intended to be comprehended within the meaning and range of equivalents of the appended claims.

What is claimed is:
1. A radial seal for rotary piston internal combustion engines which is positioned in a groove formed in the piston, said radial seal comprising, in combination: a packing strip; a plurality of radial bores provided within said strip, said bores being open only at the side of said strip facing the groove, said bores being spaced to define sections of said strip between adjacent ones thereof, and said defined sections being smaller in size at the end portions of said strip than in the center portion thereof.

2. A radial seal for rotary piston internal combustion engines which is positioned in a groove formed in the piston, said radial seal comprising, in combination: a packing strip; and a plurality of spaced radial bores provided within said strip, said bores being open only at the side of said strip facing the groove and said bores having different diameters.

3. A radial seal for rotary piston internal combustion engines which is positioned in a groove formed in the piston, said radial seal comprising, in combination: a packing strip; and a plurality of spaced radial bores provided within said strip, said bores being open only at the side of said strip facing the groove and said bores having equal diameters with varying distances between bore centers.

4. A radial seal as defined in claim 2, wherein said different diameters of said bores increase from the center portion of said strip toward the end portions of said strip.

5. A radial seal as defined in claim 3, wherein said varying distances between said bore centers decrease from the center portion of said strip toward the end portions of said strip.

6. A radial seal as defined in claim 1, wherein said packing strip is further provided with at least one axial bore.

7. A radial seal as defined in claim 6, wherein each of said bores is closed.

8. A radial seal as defined in claim 7, wherein said bores are filled with a coolant.

9. A radial seal as defined in claim 4 further comprising at least one axial bore provided within said strip, stopper means closing each of said bores, and coolant means being provided within said closed bores.

10. A radial seal as defined in claim 5 further comprising at least one axial bore provided within said strip, stopper means closing each of said bores, and coolant means being provided within said closed bores.

References Cited by the Examiner

UNITED STATES PATENTS

| 1,114,046 | 10/1914 | Roessler | 230—153 |
| 1,805,063 | 5/1931 | Wrona | 103—136 |
| 2,070,662 | 2/1937 | Johnson | 230—153 |
| 2,305,317 | 12/1942 | Nickell | 230—207 |
| 2,423,639 | 7/1947 | Czarnecki | 123—8 |
| 2,902,980 | 9/1959 | Barrett | 123—8 |
| 3,180,564 | 4/1965 | Fuhrmann et al. | 123—8 |
| 3,185,387 | 5/1965 | Paschke | 230—145 |

FOREIGN PATENTS 409,669  2/1910  France.

MARK NEWMAN, *Primary Examiner.*

W. J. GOODLIN, *Assistant Examiner.*